United States Patent [19]

Fränkle et al.

[11] 3,851,468

[45] Dec. 3, 1974

[54] APPARATUS FOR VARYING SEALING PRESSURES ON ABUTTING WALL PARTS, PARTICULARLY OF LIQUID FUEL ROCKET ENGINES FROM THE EXTERIOR OF SUCH ENGINES

[75] Inventors: Helmut Fränkle, Heilbrown-Neckargartach; Fritz Schmalzriedt, Weinsberg, both of Germany

[73] Assignee: Messerschmitt-Bolkow-Blohn Gesellschaft Mit Beschrankter Haftung, Munich, Germany

[22] Filed: Sept. 12, 1973

[21] Appl. No.: 396,358

[30] Foreign Application Priority Data
Sept. 23, 1972 Germany............................ 2246810

[52] U.S. Cl................ 60/258, 60/39.74 A, 220/45, 239/404, 239/600, 277/3, 277/236
[51] Int. Cl........................... F02k 9/02, B05b 7/10
[58] Field of Search............ 60/258, 39.74 A, 39.69, 60/39.74 R; 277/3, 236; 220/24.2, 45; 239/404, 600

[56] References Cited
UNITED STATES PATENTS

| | | | |
|---|---|---|---|
| 2,379,161 | 6/1945 | Kraps | 239/404 |
| 3,097,795 | 7/1963 | Simmons | 239/600 X |
| 3,604,632 | 9/1971 | Eichelman | 239/600 X |
| 3,717,999 | 2/1973 | Wilson | 60/258 |

*Primary Examiner*—Carlton R. Croyle
*Assistant Examiner*—Robert E. Garrett
*Attorney, Agent, or Firm*—McGlew and Tuttle

[57] ABSTRACT

A device for varying the sealing pressure of a plurality of abutting wall sealing surfaces, particularly in a liquid fuel rocket engine, comprises a first wall or combustion chamber front wall which has a face with a first sealing surface directed in a direction away from the combustion chamber which is engaged by a second sealing surface which is defined on an intermediate carrier member or wall part which also has a third sealing surface on its opposite or outer face which is directed in the same direction as the first sealing surface and is in abutting engagement with a fourth sealing surface carried on a thrust piece. Ths thrust piece may be shifted in an axial direction by pressure which may be brought to bear by changing the flexure of a flexible diaphragm of a column member in order to urge the thrust member in a direction toward the intermediate wall member in the front wall of the combustion chamber. The partition wall may be operated by a threaded bolt member which bears against the partition wall to urge it in a direction toward the thrust piece. The sealing surfaces are advantageously defined between radial flow passages extending from two separate ring conduits provided for separate propellant components. Between the abutting sealing surfaces, there are defined tangentially extending conduits for the inflow of the propellant components in a whirling flow to a central swirl chamber of a nozzle aimed into the combustion chamber.

5 Claims, 3 Drawing Figures

APPARATUS FOR VARYING SEALING PRESSURES ON ABUTTING WALL PARTS, PARTICULARLY OF LIQUID FUEL ROCKET ENGINES FROM THE EXTERIOR OF SUCH ENGINES

BACKGROUND OF THE INVENTION

1. Field of the Invention

This invention relates in general to the construction of liquid fuel rocket engines and, in particular, to a new and useful apparatus for ensuring the adjustment of sealing surfaces of an apparatus, such as a rocket engine, by adjustment from the exterior of the device in order to vary the tightness of sealing engagement between the surfaces after assembly of the device.

2. Description of the Prior Art

For special reasons, housing of machines, devices and apparatus are sometimes so constructed that they can no longer be dismounted after their assembly. This is true if the individual parts of the housing are welded with each other during the assembly, as is the case, for example, in extremely small liquid fuel rocket engines. The necessity arises, among others, to design the total construction of the combustion chamber head so that seals formed by annular surfaces, which separate the radially outside supply ring conduits for the two propellant components from the radially inside swirl chambers, are still completely operable even after the individual parts of the combustion chamber have been welded together and with the combustion chamber proper. Since the amounts of propellant to be put through in extremely small engines are very small, it is necessary, in order to produce a sufficient energy of rotation in the twist nozzle or in the combustion chamber, that the entire propellant flows through the tangential twist bores extending in the combustion chamber into the twist chambers. Despite extreme precision in the manufacture and assembly, it can happen that the annular surface seals in question become leaky after the assembly of the housing, by distortion of the latter, and this can be detected only after the housing is assembled by a subsequent pressure test on the basis of a measurement of pressure drop. But, if these sealing surfaces do not bear absolutely tightly on each other, a part of the propellants flows in an undesired manner from the outer supply ring conduit over the sealing surface in substantially radial direction into the twist chamber with great energy losses and without twist. These amounts are not available in quantity and energy for the necessary production of the whirling flow, so that the residual amounts of propellant entering the twist chamber through the tangential bores are no longer sufficient to produce the necessary atomization and the desired combustion process in the combustion chamber. Since a sealing defect, as mentioned above, can only be detected after the welding of the housing, it is no longer repairable, so that the entire combustion chamber must be considered a waste.

SUMMARY OF THE INVENTION

In accordance with the invention, there is provided, a device which permits the pressing of the sealing surfaces together after the assembly of a device, such as a rocket engine.

A carrier member for one or several sealing surfaces, which form seals with adjoining sealing surfaces, is designed as an expansion zone or expansion collar, and the sealing surfaces are pressed against each other after assembly from the outside by a pressure member bearing on an elastic partition which closes the pressure chamber to the outside.

According to the invention, a bush or collar is inserted pressure-tight in the combustion chamber head, particularly by welding, and it is provided with a diaphragm which acts as an elastic partition. The bush serves to guide, for example, a bolt or screw in the pressure member and it bears on a thrust piece which can be adjusted by the pressure member acting on a diaphragm. The thrust piece is provided on its side remote from the diaphragm with one of the existing annular sealing surfaces. In addition, a twist nozzle with two sealing surfaces is provided, which is connected with the combustion chamber head over the carrier designed as an expansion collar, of which one sealing surface pointing to the outside forms a seal with the sealing surface of the thrust piece, while the other inwardly pointing sealing surface forms a seal with a sealing surface associated directly or indirectly with the combustion chamber head.

In a further development, a front wall serving as an abutment is provided in the combustion chamber head on which is arranged the sealing surface cooperating with the inwardly pointing sealing surface of the twist nozzle.

In a further development of the invention, the expansion collar of the carrier of the sealing surfaces is formed by the annular grooves provided on the carrier, which serve by the provision of ring conduits for the supply of liquid or gaseous fuels or propellant components to the twist nozzle or combustion chamber.

The invention permits, after the assembly of the machine housing or of the combustion chamber, the compression from the outside in a very simple manner of the annular sealing surfaces which have become leaky by the assembly operations, particularly by welding, due to distortion of the housing, so that their tightness can be subsequently restored.

Accordingly, it is an object of the invention to provide an improved construction of a sealing wall or walls, particularly for sealing surfaces of metal wall members which abut one or more conduit formations defined by grooves of two adjacent abutting members and which includes a thrust piece having one of these sealing surfaces which may be pressed in a direction to apply closing sealing pressure to the sealing surfaces by a pressure member which includes an elastic partition which may be deformed by the application of a pressure force thereto.

A further object of the invention is to provide a rocket engine having a combustion chamber which is closed by a front wall which has an exterior surface defining a portion of an annular groove with an intermediate member defining the remaining portion and wherein the intermediate member also defines another annular groove with a thrust piece, the grooves leading through tangentially directed passages to a central swirl chamber and having a nozzle discharge into the combustion chamber and wherein there is provided a pressure member having a partition wall bearing against the thrust piece which may be deflected from the outside of the combustion chamber in order to tighten the sealing surfaces after assembly of the device.

A further object of the invention is to provide a construction for tightening the sealing surfaces of sealing joints after assembly of an apparatus which is simple in design, rugged in construction, and economical to manufacture.

For an understanding of the principles of the invention, reference is made to the following description of a typical embodiment thereof as illustrated in the accompanying drawing.

GENERAL DESCRIPTION OF THE PREFERRED EMBODIMENT

Figure 1:
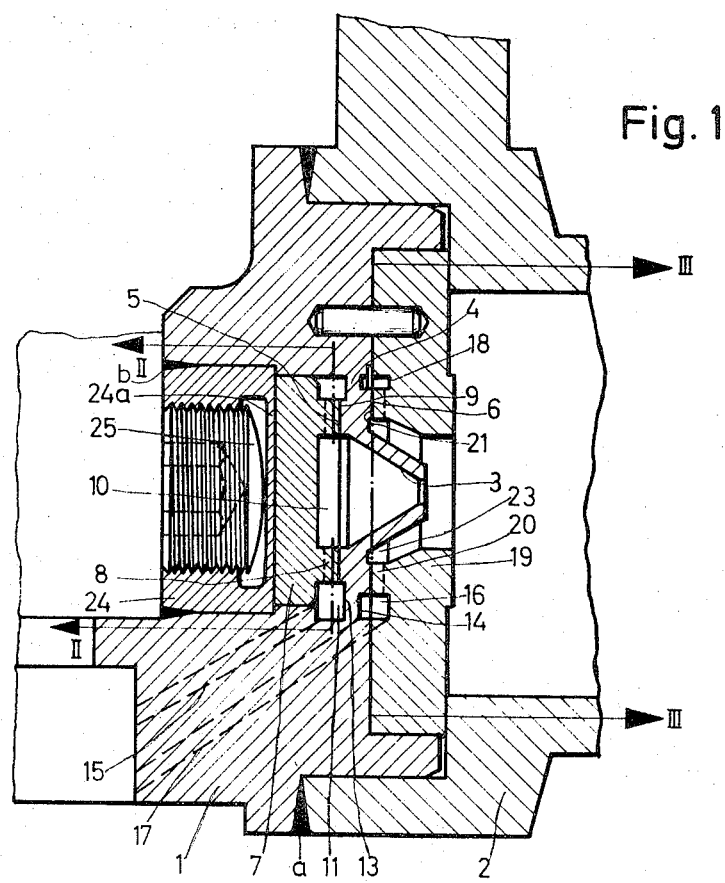
FIG. 1 is a partial longitudinal sectional view of the front part of a rocket combustion chamber of a liquid fuel rocket engine constructed in accordance with the invention.

Referring to the drawing in particular, the invention embodied therein, comprises an apparatus for sealing the joints of a device which comprises an assembly of a plurality of members which together form abutting sealing joints and which in the embodiment of the invention disclosed herein, comprises a liquid fueled rocket engine. In accordance with the invention, the rocket engine 50 includes a tubular part 2 forming a combustion chamber having a combustion chamber head, generally designated 1, which is secured to the combustion chamber 2 by a weld $a$ which is advantageously produced by electron beam welding.

The combustion chamber head 1 includes a central twist nozzle 3 for a propellant component, for example, for fuel. The twist nozzle is formed in an intermediate member or carrier 4, which is disposed between a combustion chamber front wall 19 and a thrust piece 7. The first or front wall 19 has a face with a first sealing surface 6 directed in a direction away from the combustion chamber. The carrier member, or second wall, has one face with a second sealing surface 21 in abutting engagement with the first sealing surface 6 and it also has an opposite face at its opposite end with a third sealing surface 5 which is directed in the same direction as the first sealing surface 6. The thrust piece 7 has a fourth sealing surface 9 in abutting engagement with the third sealing surface 5. The fourth sealing surface 9 is contained on an inwardly directed collar of the thrust piece 7 and it forms together with the third sealing surface 5 a seal between the swirl chamber 10 of the twist nozzle 3 and a ring conduit 11 for the supply of a propellant component, for example, for the supply of fuel. Tangential slots 12, having a triangular cross-section, are defined in the collar 8 and permit a whirling inward flow from the ring conduit 11 into the swirl chamber 1o for the atomization of the fuel.

Figures 2, 3:
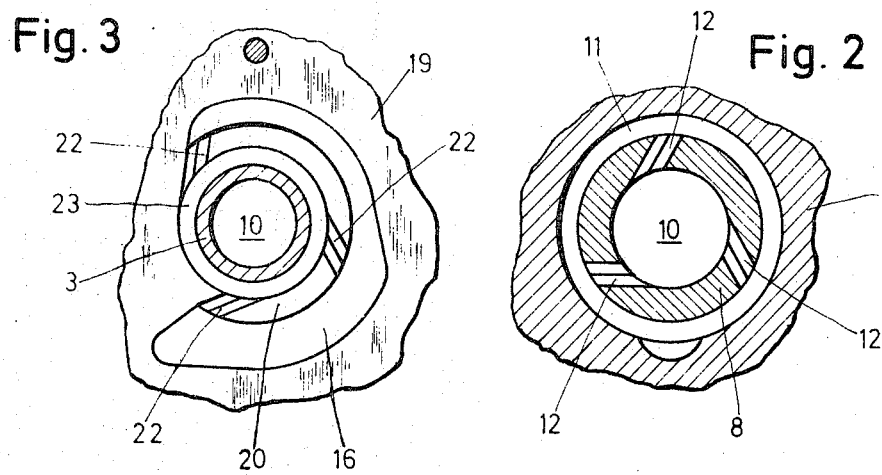
FIG. 2 is a section taken along the line II—II of FIG. 1.
FIG. 3 is a section taken along the line III—III of FIG. 1.

The carrier 4 and the thrust piece 7 has annular grooves 13 so that when they are fitted together they form the ring conduit 11 which connects to a supply duct 15. An annular groove 14 defined between the sealing surfaces of the front wall 19 in the intermediate wall or carrier 4 comprises the annular grooves 14 which form the ring conduit 16 which is supplied through a supply duct 17 with a second propellant component, for example, an oxygen carrier, which reacts hypergolically with the fuel. The ring conduit 16 is limited by a groove 18 which is provided in the front wall 19 of the combustion chamber. Radially inside the ring conduit 16, there is a collar 20 on the front combustion wall 19 having an outwardly pointing end face which forms the second sealing surface 21. This end face also carries triangular tangential slots 22, as shown particularly in FIG. 3, which open into a twist chamber 23, arranged around the nozzle 3.

In the stepped bore of the combustion chamber head 1, there is secured by a weld $b$, a bushing 24 which comprises a pressure member having a deformable partition wall inner end 24a which bears against the thrust piece 7. A pressure applicator member or bearing member 25 comprises a threaded bolt which is threaded into the bush 24 and may be brought to bear against the partition 24a to force it in a direction against the thrust piece 7 in order to tighten the various sealing surfaces defined between the various parts.

If the seals formed by the annular sealing surfaces 5 and 9, as well as by the sealing surfaces 6 and 21, should not work after the assembly of the combustion chamber head 1 in the remaining portion of the combustion chamber, so that they are not absolutely tight, the pressure member 24 may be tightened against the thrust piece 7 by the rotation of the bolt 25 within the bush 24. In this manner, all of the sealing surfaces are pressed tightly together because of the limited elasticity of the carrier 4.

While a specific embodiment of the invention has been shown and described in detail to illustrate the application of the principles of the invention, it will be understood that the invention may be embodied otherwise without departing from such principles.

What is claimed is:

1. A device for sealing the surfaces of an assembled device, particularly by pressing together the sealing surfaces forming a head of a combustion chamber in a liquid fuel rocket engine, comprising a first wall having one face with a first sealing surface, a second wall member connected to said first wall, and having one face with a second sealing surface in abutting engagement with said first sealing surface and having an opposite face at its opposite end with a third sealing surface directed in the same direction as said first sealing surface, a thrust piece having a fourth sealing surface in abutting engagement with said third sealing surface, a pressure member connected to said second wall member, and having an elastic partition wall bearing against said thrust piece in a direction to urge it toward said first wall and said wall, and means engageable with said elastic partition to bend said partition toward said thrust piece to cause tighter sealing engagement of said second and first sealing surfaces and said third and fourth sealing surfaces.

2. A device according to claim 1, wherein said pressure member comprises a bush, said second wall member comprising a carrier having a recess in which said bush is positioned, said pressure member being secured to said carrier and containing said elastic partition wall bearing against said thrust piece, said second wall member defining a central swirl nozzle and a means defining a combustion chamber extending outwardly from said swirl nozzle, said first member defining a front wall closing said combustion chamber and surrounding said swirl nozzle.

3. A device according to claim 2, wherein said combustion chamber front wall includes a central opening accommodating said swirl nozzle.

4. A device according to claim 1, wherein said first wall comprises a front wall of a combustion chamber, said second wall comprising a carrier member having a central nozzle portion extending through said front wall of said combustion chamber, said second and first sealing surfaces having grooves therein defining a ring conduit for a first propellant component and also having tangentially extending passages from said ring conduit into said swirl nozzle, said third and fourth sealing surfaces having complimentary annular grooves defining a second ring conduit containing a second propellant component and including tangential passages extending from said second ring conduit to said swirl nozzle.

5. A liquid fuel rocket engine, comprising a tubular wall forming a combustion chamber, a combustion chamber front wall closing one end of said combustion chamber and having a central opening therethrough, said combustion chamber and wall having a first sealing surface, an intermediate carrier wall connected to said combustion chamber front wall and having a face with a second sealing surface in abutting engagement with said first sealing surface, said first and second sealing surfaces together defining an annular ring conduit for a first propellant component having at least one tangential passage therefrom leading into a swirl nozzle, said swirl nozzle being formed centrally of said carrier member and extending through the opening of said front wall, said intermediate carrier wall having an opposite face at its opposite end with a third sealing surface directed in the same direction as said first sealing surface, a thrust piece having a fourth sealing surface in abutting engagement with said third sealing surface, said carrier having a recess in the outer end thereof, a pressure member bush disposed in said recess and connected to said intermediate carrier wall, and having a partition wall at its interior bearing against said thrust piece, and means engageable with said partition wall for deflecting said wall into engagement with said thrust piece to move said thrust piece toward said combustion chamber front wall and to cause an increase in pressure on said second and first and third and fourth sealing surfaces.

* * * * *